Aug. 11, 1925.

T. L. VALERIUS 1,548,859

LIQUID MEASURING DEVICE

Filed Nov. 9, 1921

Witness:
John E. Titus.

Inventor
Theodore L. Valerius
by Hewitt S. Dixon
Atty

Aug. 11, 1925.

T. L. VALERIUS 1,548,859

LIQUID MEASURING DEVICE

Filed Nov. 9, 1921   2 Sheets-Sheet 2

Witness: John E. Titus

Inventor Theodore L. Valerius

Patented Aug. 11, 1925.

1,548,859

UNITED STATES PATENT OFFICE.

THEODORE L. VALERIUS, OF FORT ATKINSON, WISCONSIN, ASSIGNOR TO THE CREAMERY PACKAGE MFG. COMPANY, OF CHICAGO, ILLINOIS, A CORPORATION OF ILLINOIS.

LIQUID-MEASURING DEVICE.

Application filed November 9, 1921. Serial No. 513,993.

*To all whom it may concern:*

Be it known that I, THEODORE L. VALERIUS, a citizen of the United States, residing in the city of Fort Atkinson, State of Wisconsin, have invented new and useful Improvements in Liquid-Measuring Devices, of which the following is a specification.

The invention relates to a liquid measuring device having particular application to batch measuring tanks employed with ice cream freezers.

In the commercial manufacture of ice cream, it is customary to mount a receptacle or tank upon the freezer, into which the liquid ingredients for the ice cream are drawn in measured quantity from a mixing reservoir and later discharged into the freezing cylinder of the ice cream freezer. In ordinary practice heretofore it has been necessary for an attendant to open an inlet valve controlling a supply pipe from the mixing reservoir and stand by while the batch tank is being filled to close the valve when the desired quantity has been drawn. This necessity prevents the attendant from simultaneously filling several batch tanks or attending to other duties when a number of freezers are being operated.

Accuracy of measurement of the liquid batches is an important factor in the production of ice cream of uniform quality. The nature of the ingredients is such that froth is formed with the inflowing liquid which makes it difficult to determine by sight the actual level of the liquid in the tank, further handicapping the otherwise uncertain operation of filling the batch tanks by manual operation of the valve.

One of the objects of this invention is to provide an automatic or float controlled valve which will admit to the batch tank an exactly measured quantity of mix, and automatically shut the supply, without attention from an attendant other than the initial opening of the valve.

Another object is to provide an automatically controlled valve for batch tanks which is adjustable to vary, as desired, the amount of liquid admitted at each operation.

A further object is to provide a float controlled valve in which the float is prevented from reopening the valve when the level of the liquid in the tank is lowered by the discharging of the liquid into the freezer, the opening of the valve requiring manual operation when it is again desired to fill the tank.

A further object is to provide an automatic batch tank valve of such construction that it may be readily disassembled for cleaning and sterilizing.

Other objects and advantages will be apparent in the following description of a preferred embodiment of my invention which I have illustrated in the accompanying drawings. It will be understood, however, that in the interpretation of the appended claims they are not limited to the precise construction and arrangement set forth, as, obviously, my invention is applicable to many uses for the automatic measurement of liquids, and I aim to cover in the claims all legitimate modifications and variations thereof.

In the accompanying drawings Fig. 1 represents an embodiment of my invention as employed in a batch tank mounted on a freezer of the horizontal type, and showing the valve mechanism partially in vertical section.

Figure 1:
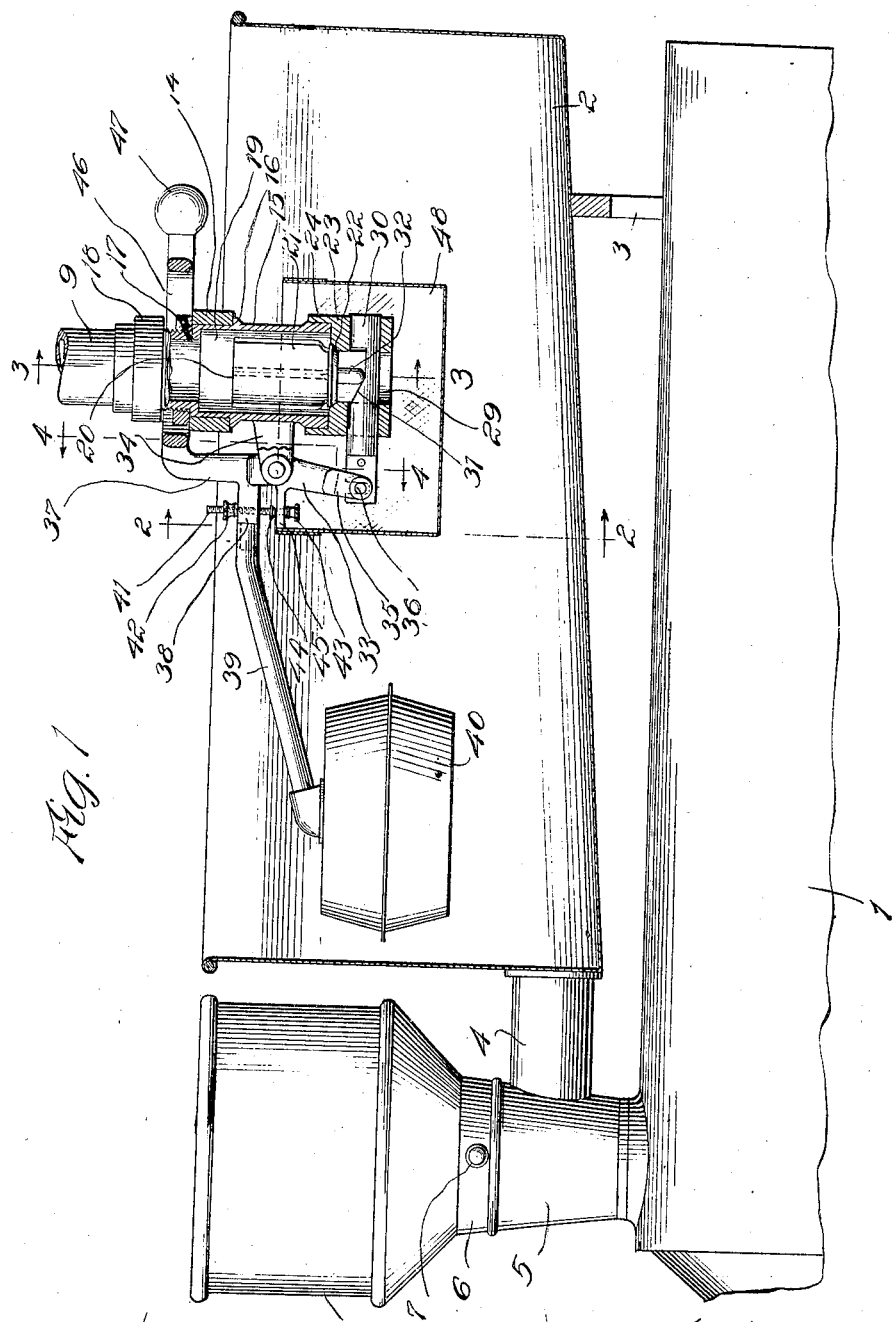
Figure 2:
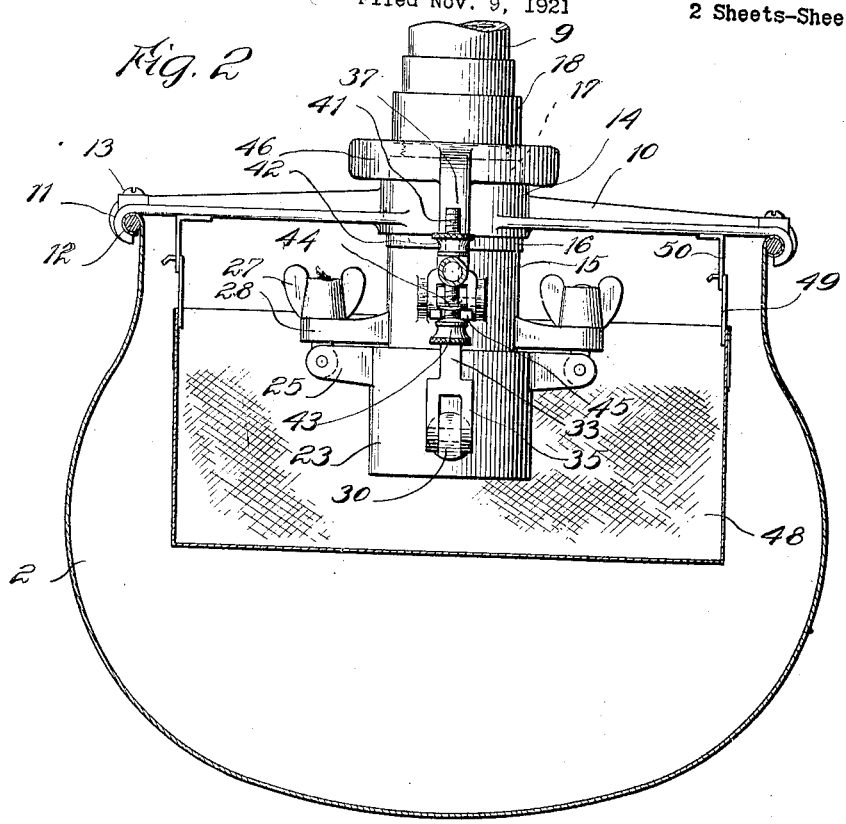
Fig. 2 represents a cross sectional view of the valve, tank and associated parts taken on the plane of the line 2—2 in Fig. 1.
Figures 3, 4:
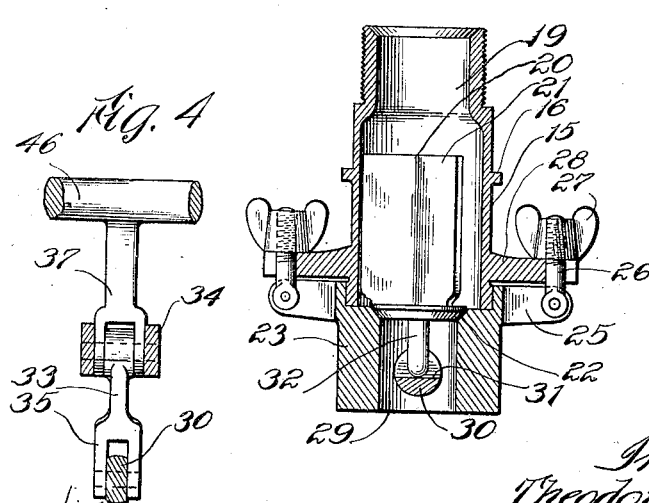
Fig. 3 is a cross section of the valve taken on the plane of the line 3—3 in Fig. 1.
Fig. 4 is a cross section of the valve operating mechanism taken on the plane of the line 4—4 in Fig. 1.

Referring first to Fig. 1, the numeral 1 indicates the freezing cylinder of an ice cream freezer above which is mounted a batch tank 2 supported at its rear end upon a bracket 3 carried by the freezer. Secured to the lower portion of the front end of the tank is a discharge pipe 4 opening into the tank and leading to a feed inlet 5 into the freezing chamber within the cylinder 1. The inlet 5 comprises a tubular valve casing extending through the upper wall of the freezer and by connection with the pipe 4 provides support for the front end of the tank 2. A tubular valve 6, having a conical bearing seat in the casing 5 is arranged to control the discharge of mix to the freezer. The valve 6 is rotatable on a vertical axis to bring its lateral port (not shown) into register with the outlet 4 of the batch tank, the handle 7 being provided for that purpose.

The upper end of the valve 6 may carry a feed funnel 8 communicating through the tubular valve with the freezing chamber and conveniently arranged for the introduction of fruit flavoring into the freezer through the one passage. The bottom of the batch tank is inclined toward the outlet to the discharge pipe 4 so that with the opening of the valve 6, the contents of the tank are drained into the freezer.

A supply pipe 9, connected with the mixing reservoir (not shown) in which the liquid ingredients are prepared, terminates above the open upper side of the tank 2.

A cross rail 10 bridges the side walls of the tank and is secured to the upper edges thereof by means of the curved ends 11 of the rail forming recesses to receive the edges 12 of the tank walls, the latter being secured therein by set screws 13.

The mid portion of the cross rail 10 is constructed to form an annular sleeve 14, within which is supported a valve casing 15 having an outer peripheral flange 16 abutting the lower end of the sleeve 14. The screw threaded upper portion of the casing carries a collar 17 bearing upon the upper end of the sleeve and rigidly securing the casing therein. The upper end of the casing 15 is connected with the supply pipe 9 by means of the union 18.

The casing 15 encloses a valve chamber 19 within which is operatively positioned a member 20 having radially extending guide wings 21 and adapted for longitudinal movement on a vertical axis. The lower end of the member 20 forms a valve 22 having its seat in the cap 23 removably closing the lower end of the casing 15. The cap 23 is provided with an upper flange 24 within which is slidably fitted the lower end of the casing, and is also provided with laterally extending pairs of spaced ears 25, each pair pivotally supporting an eyebolt 26 having a winged nut 27 threaded on its free end. A pair of laterally extending bifurcated lugs 28 formed on the lower wall of the casing 15, are positioned to receive the eyebolts 26 when the cap 23 is in assembled position, the latter being secured in sealed relation to the casing by tightening the winged nuts 27 over the lugs 28.

A vertical passage 29 through the cap 23 opens into the chamber 19 through the seat for the valve 22, and is controlled by the valve 22 in the inflow of mix from the supply reservoir to the batch tank.

The valve member 20 is operatively controlled by a sliding bar 30, positioned transversely of the passage 29 and having its bearings in the side walls of the cap 23. In that portion of the bar 30 traversing the passage 29, a recess is formed in the upper side of the bar, the contour of which describes a cam 31 adapted to engage a stud 32 extending downwardly from the valve member 20. It will be obvious that the longitudinal movement of the bar 30 will operate to raise and lower the valve 22 in relation to its seat.

To control the operating movement of the bar 30, I have provided a bell crank 33, pivoted in a bifurcated support 34 formed rigid with the side wall of the casing 15. The lower arm of the bell crank preferably terminates in a yoke 35 carrying a cross pin 36 which is operatively engaged in an upwardly open transverse slot formed in the outer end of the bar 30 extending within the yoke 35. This construction permits the ready and complete removal of the cap 23, bar 30 and valve member 20 by releasing the eyebolts 26.

Pivoted on the same axis with the bell crank 33 is a lever 37 having a lateral arm 38 extending outwardly and rigidly connected with a tubular support 39 carrying a float 40.

Near the base of the lateral arm 38 I have provided an adjustable operating connection between the float controlled lever 37 and the bell crank 33, comprising a post 41 threaded through the arm 38 and having a lock nut 42 adapted to rigidly secure the post in adjusted position. The lower end of the post 41 is provided with a turning head 43 and an annular collar 44 spaced inwardly therefrom, the opposing faces of the head and collar, being preferably spherically curved.

Embracing the post 41 between the head 43 and collar 44 is a slotted arm 45 of the bell crank 33. By means of this adjustable connection the relative positions of the float 40 and the valve operating bar 30 may be varied so that the cam 31 will be in position to seat the valve 22 at any predetermined level of liquid in the tank which may be desired.

A handle for the manual operation of the valve mechanism may be rigidly mounted on the upper end of the lever 37, in the present instance comprising a ring 46 integral with the lever and surrounding the valve casing in substantially spaced relation thereto. A ball 47 may be mounted on the opposite side of the ring in position to be conveniently grasped. The ring and ball further serve to partially counter balance the weight of the float 40, thus increasing the sensitiveness of the float control mechanism.

A strainer for the inflowing mix also may be provided. I have shown herein a box like strainer 48 into which the mix is discharged from the valve orifice 29, the strainer being removably suspended from the cross rail 10 by means of upright hooks 49 secured to the sides of the strainer and engaged in slots formed in a pair of depending brackets 50 mounted on the underside of the cross rail.

In the operation of the device as illustrated, the handle ball 47 is swung upward whereby the float is lowered, and the cam bar 30 is moved to raise the valve 22 from its seat, thus admitting mix from the pipe 9 into the strainer and the batch tank. As the level of the liquid rises, the float is raised, the latter operating through the bell crank 33 to gradually withdraw the bar 30 and permit the stud 32 to pass down the inclined cam face 31 until the valve 22 is completely seated and the flow is shut off.

Upon draining off the batch from the tank into the freezer, my device is so constructed that the float is retained in its upper position and the valve remains closed against the further flow of the mix into the tank with the lowering of the level of the mix being drained into the freezer. This desirable result is obtained from the construction and the relation of the valve member with its operating cam bar. The angle of the cam face 31 and the weight of the valve member 20 produce enough friction in the wedging movement of the cam in raising the valve, so that the effective weight of the float after drawing off the batch is not sufficient to operatively open the valve. The partial counterbalancing of the float by the operating handle, and the weight of the liquid in the supply line over the closed valve, are aiding factors in maintaining the valve in closed position until it is positively opened by manual operation. My construction avoids the necessity for any independent locking or supporting means for the float when the batch tank is drained.

It will now be apparent that I have provided an effective and simple device for the automatic measurement of a predetermined amount of liquid into a receiving tank, which necessitates a minimum of attendance in operation, and is of sanitary construction.

I claim as my invention:

1. A device of the class described, comprising a receptacle, a valve casing mounted in said receptacle and connected with a supply of liquid, a valve seat in said casing having an aperture therethrough, a valve member in operative engagement with said seat and having a portion extending through said aperture, a cam operatively engaging said extended portion to move said valve member from its seat or permit re-seating thereof, and a float having operative connection with said cam, said float and connection being solely effective with the rise of liquid in said receptacle to move said cam to permit the re-seating of said valve, and requiring extraneous force to move said cam, after discharge of said liquid, to unseat and re-open said valve.

2. A device of the class described, comprising a receptacle, a casing mounted in said receptacle having a valve chamber, said chamber having a valve seat and a discharge aperture through said seat, a valve member in said chamber adapted to operatively engage said seat and having a portion extending through said aperture, a bar slidable transversely of said aperture and having a portion of its surface angularly disposed to its direction of movement to form a cam, said cam being in operative engagement with the extended portion of said valve, lever means for moving said bar, and a float to actuate said lever means.

3. A device of the class described, comprising a receptacle, a cross rail on the upper edges of the side walls of said receptacle, an inlet valve supported on said cross rail, a strainer positioned to receive liquid from said valve and removably supported on said cross rail, and float controlled means for operating said valve.

4. A device of the class described, comprising a receptacle, an inlet thereto, a valve controlling said inlet, a cam operable to open and close said valve, a float, and operative connections between said float and said cam, said cam and valve being so constructed and operatively arranged to cause the closing of said valve upon the elevation of said float by liquid flowing into said receptacle and to sustain said float in elevated position after the discharge of the liquid from said receptacle until said float is manually depressed to open said valve.

In testimony whereof I have hereunto set my hand.

THEODORE L. VALERIUS.